United States Patent [19]

Slavens

[11] Patent Number: 4,635,839
[45] Date of Patent: Jan. 13, 1987

[54] WELDING CARRIAGE

[75] Inventor: Clyde M. Slavens, Houston, Tex.

[73] Assignee: CRC-Evans Pipeline International, Inc., Houston, Tex.

[21] Appl. No.: 581,504

[22] Filed: Feb. 17, 1984

[51] Int. Cl.$^4$ .............................................. B23K 5/08
[52] U.S. Cl. .................................... 228/29; 219/60 A; 104/119; 105/33; 105/144
[58] Field of Search ....................... 228/29; 219/60 A; 104/118, 119, 247; 105/32, 33, 141, 144

[56] References Cited

U.S. PATENT DOCUMENTS

| | | | |
|---|---|---|---|
| 1,284,186 | 11/1918 | Failyer | 105/33 |
| 1,445,612 | 2/1923 | Dobbins | 105/144 |
| 3,437,053 | 4/1969 | Bush et al. | 105/141 X |
| 3,840,170 | 10/1974 | Arikawa et al. | 228/29 |
| 3,974,356 | 8/1976 | Nelson et al. | 219/60 A |
| 4,260,869 | 4/1981 | Slavens et al. | 228/29 X |
| 4,331,278 | 5/1982 | Sherer et al. | 228/29 |

FOREIGN PATENT DOCUMENTS 678783 9/1952 United Kingdom .................. 105/32

Primary Examiner—Robert P. Olszewski
Attorney, Agent, or Firm—Richards, Harris, Medlock & Andrews

[57] ABSTRACT

Welding carriage, including an articulated body having support wheel sets on its end sections, one of said end sections supporting a drive assembly movable toward and away from a track upon which the carriage travels, the drive assembly including two tandem drive wheels driven by an electric motor supported by the drive assembly. The carriage may support one welding head or plural welding heads, so that one or more weld beads may be formed as the carriage travels past a section of a welding groove.

4 Claims, 4 Drawing Figures

WELDING CARRIAGE

BACKGROUND OF THE INVENTION

In the usual approach to welding together successive lengths of pipe to form a pipeline by automatic welding, the welding is performed by providing a carriage which runs about a track mounted around the end of one pipe, and which carries a welding apparatus which is disposed laterally of the carriage at the location of the pipe end joint with another pipe. When the welding carriage is rotated about the track to weld the pipe joint seam the welding tip must be accurately located with respect to the seam and must move without undue vibration along the seam. Welding is usually done by arcuate segments in a selected sequence so that effects of heating do not unduly distort the pipe. The weld bead is usually formed in 90° segments. Opposite 90° segments may be welded at the same time, for which two carriages may be used on the same track. Some weld segments are formed with carriage travel in one direction while others are formed with carriage travel in the opposite direction. The weld segments are preferably slightly larger than 90° in order that small overlaps between the weld segments will be provided. In the use of such equipment, it frequently occurs that the welding tip does not accurately follow the seam, the welding carriage may slip on the track causing burn-throughs at the weld seam, adequate control of welding speed and weld penetration may not be achieved, unwanted vibrations or oscillations of the welding tip may be encountered, and many other unwanted events may occur during the course of making a weld which will detract from the quality of the weld and may take excessive time in making a weld. Because of the insufficiencies of the prior art apparatuses, the apparatus of this invention is provided in an effort to improve the state of the art.

SUMMARY OF THE INVENTION

The welding carriage apparatus provided by this invention includes an articulated carriage body which is supported at its opposite ends by oppositely disposed sets of wheels engaging a loop track around an object. Each set of wheels includes a wheel above the carriage track, a wheel beneath the carriage track, and a grooved wheel which engages the track edge. In this way, the carriage is firmly connected to the track and not subject to movements once placed upon the track. The wheel sets at one side of the track are pivotal, so that they may be moved away from the track, which makes for simple installation of the apparatus upon the track. The wheels at the outer and inner faces of the track are spaced to match the track thickness and firmly engage the track. The wheels which engage the track edges are also firmly engaged against the track and serve to prevent lateral movements and vibrations of the carriage on the track. A unitized drive assembly for the carriage includes tandem wheels, one forward of the other, which engage the outer track face along a common line and are spring biased against the track. The drive wheels are relatively large. The track is preferably provided with a frictional surface strip along the outer face of the track in order that adequate traction by the drive wheels is obtained. The drive wheels and an electric servo drive motor have a common support and are moved together toward or away from the track. A crank device which overcomes a spring bias of the wheels toward the track serves to raise the wheels away from the track when desired. The servomotor is connected to the drive wheels by a simple gear system, thereby minimizing breakdowns and difficulties with the drive assembly. The tandem drive wheel arrangement provides for excellent traction, prevents slipping of the carriage on the track and provides uniform driving speeds along the track.

A principal object of the invention is to provide a welding carriage for use on a track surrounding a pipe or other convex object and which is dependable in use and which is designed to provide lengthy useful service. Another object of the invention is to provide a carriage which is stable in travel about the track and which may be smoothly driven about the track without slippage. A further object of the invention is to provide a welding carriage which is relatively light in weight and economical in manufacture. An additional object of the invention is to provide a welding carriage which provides a stable mount for welding equipment which may comprise either a single welding head or plural welding heads.

Other objects and advantages of the invention will appear from the following detailed description of a preferred embodiment, reference being made to the accompanying drawings.

BRIEF DESCRIPTIONS OF THE DRAWINGS

DESCRIPTION OF THE PREFERRED EMBODIMENTS

Figure 1:
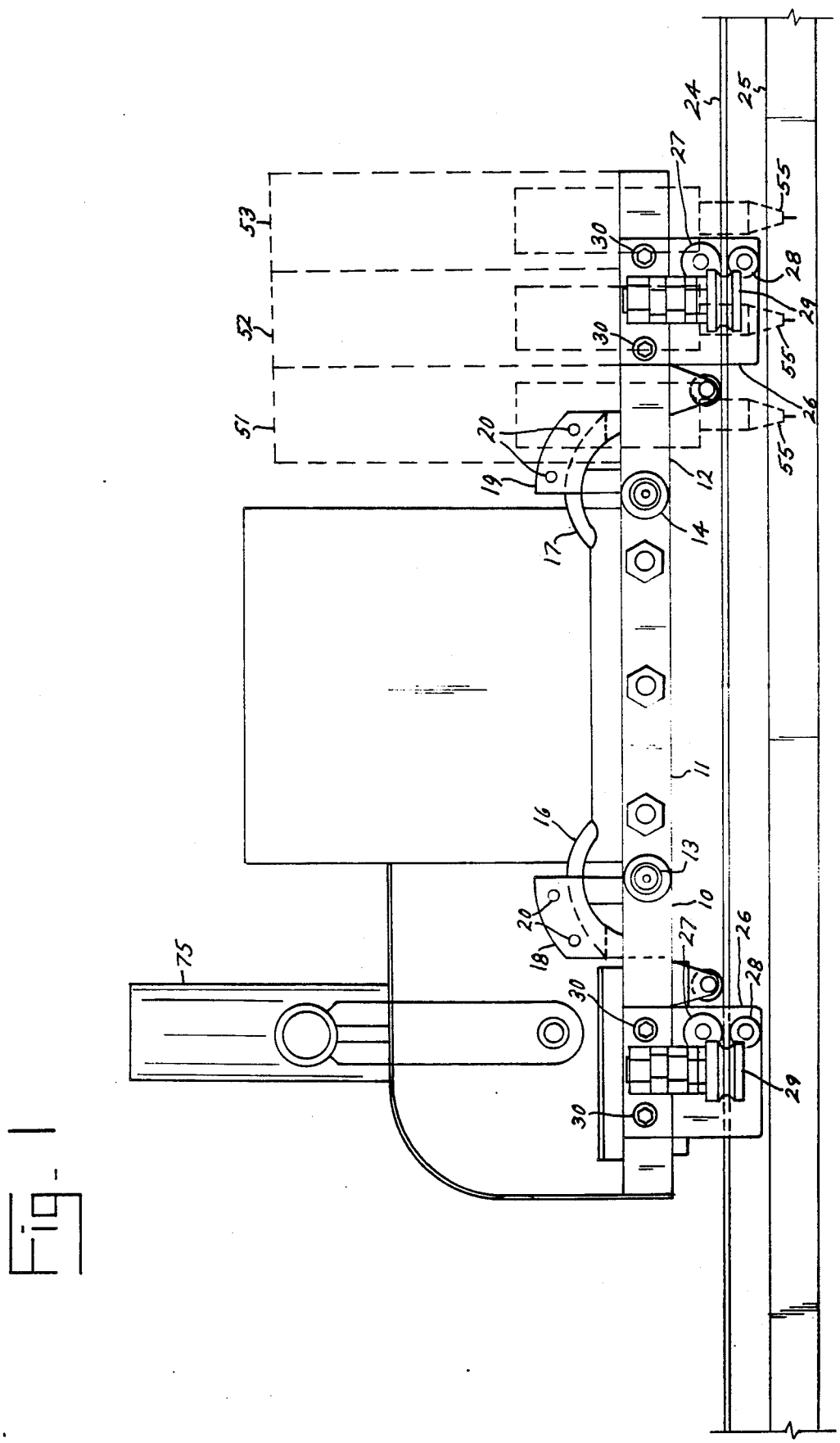
FIG. 1 is a side elevation of a welding carriage of preferred form according to the invention.

Referring to the drawings in detail, the welding carriage has a three part base comprising plates 10, 11, 12 pivotally connected at transverse shafts 13, 14. The plates may be aligned, as shown in FIG. 1, or may be in mutually angular dispositions controlled by movement of curved slides 16, 17 movable through clamps 18, 19, respectively. Slides 16, 17 are fixed to plate 11, while clamps 18, 19 are fixed to plates 10, 12, respectively. By loosening and retightening the screws 20 the clamps 18, 19 may be released and retightened, permitting movement of the slide bars 16, 17, therethrough. Therefore, the welding carriage may be used for travel along a straight track or a convexly curved track, for example a track disposed about a pipe. The track 24 is shown disposed parallely spaced from a support 25, the support 25 being a tank or pipe wall or other object to be welded. Work other than welding may be performed through use of the carriage.

Figure 2:
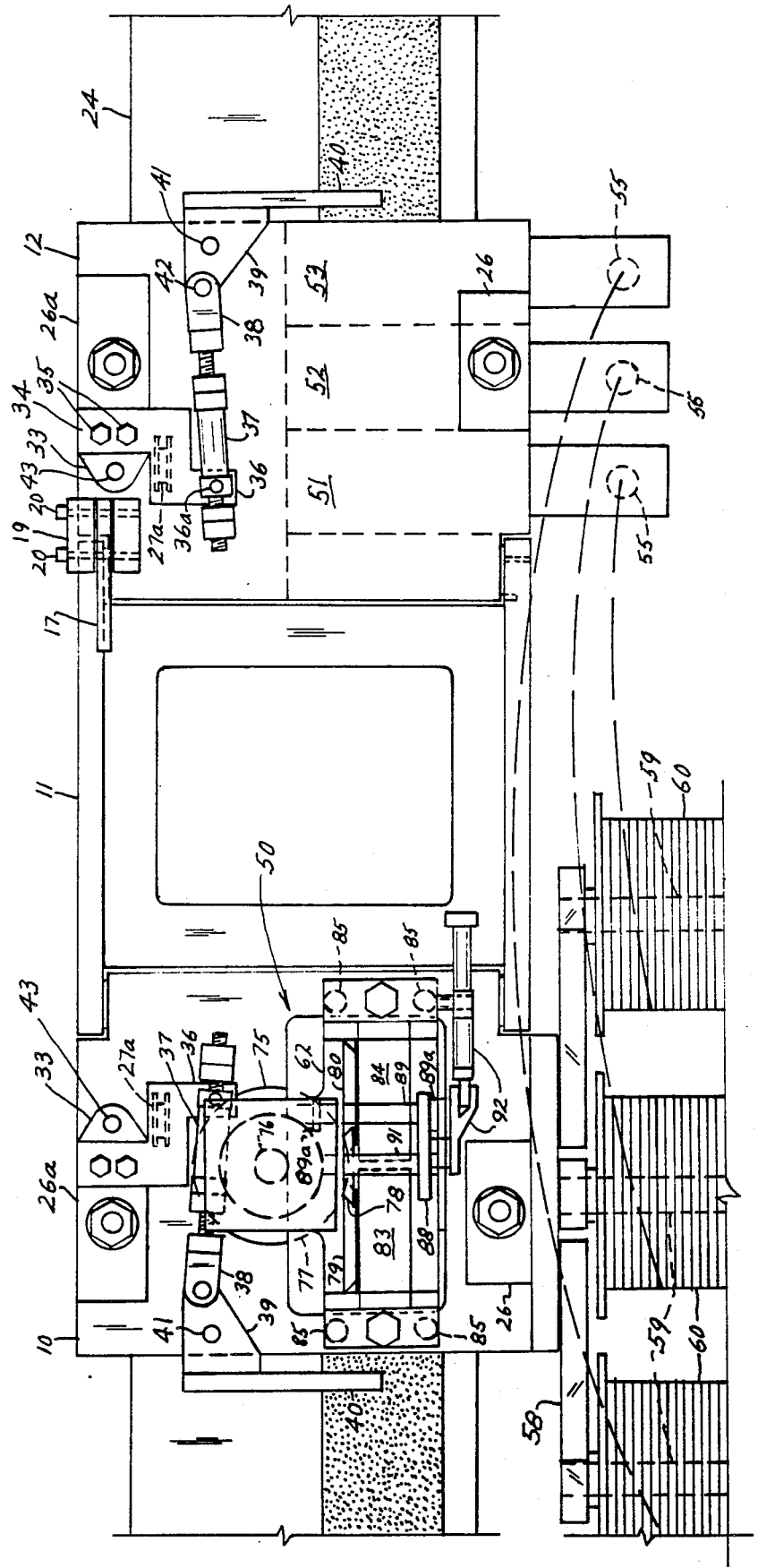
FIG. 2 is a top elevation of the welding carriage shown in FIG. 1.

Base plate 10 supports two mirror image support wheel assemblies 26, one at each of its sides at opposite sides of track 24 and carriage base plate 12 in the same manner supports two mirror image support wheel assemblies 26, one at each side of the track 24. Carriage base plate 11 has no supporting wheels. Each support wheel assembly 26 includes a wheel 27 which engages the outer track surface, or face, and a wheel 28 which engages the inner track surface. Each assembly 26 also includes a grooved wheel 29 which engages the track edge. One assembly 26 is secured to plate 10 by two screws 30, each assembly 26 being disposed in a side recess of plate 10 or plate 12, respectively. The wheel assemblies 26 shown in FIG. 1 are at the near side of the carriage to the viewer of FIG. 1, and the back assemblies 26 at the opposite side of the carriage are seen in top plan view in FIG. 2. The back wheel assemblies 26a are modified somewhat from those shown in FIG. 1, having end pivot brackets 33 by which they are pivotally mounted. Each wheel assembly 26a has connected thereto a zigzag lever bar 34, connected thereto by two or more screws 35. The inner end 36 of each bar 34 is pivotally connected to a compressively spring loaded arm 37 which is adjustably connected to a toggle 38. Each toggle 38 is connected pivotally to a rotative bracket 39 having a handle arm 40, the bracket connections to plates 10, 12 being at pivot screws 41. When the handles 40 are moved outwardly from the plates 10, 12, the toggles 38 and arms 37 draw the levers 34 toward the handles and pivotally swing the wheel assemblies 26a outwardly about pivots 43. Idler wheels 27a support the back side of the carriage while it is being latched to the track. After the wheels of the front wheel assemblies have been properly placed on the track, the arms 40 are moved inwardly to latch the wheel assemblies 26a against the track. It will be noted that the pivots 42 are moved past dead center (a straight line between pivots 36a, 41 so that accidental movement of the wheel assemblies 26a outwardly will not occur.

Plate 10 supports the drive wheel assembly 50. Plate 12 supports the welding head equipment, which may consist of one or more welding head assemblies 51, 52, 53, these being shown schematically in FIGS. 1 and 2. The carriage may, therefore, be used to provide application of one to three or more weld beads in a welding groove around the end of a pipe abutted with another pipe of the same diameter. The welding heads may be of any suitable type, preferably having their welding tips 55 position adjustable both along and transversely in all directions to the welding groove between the pipe ends. The welding wire for supplying the welding heads may be supported by a plate and bracket assembly 58 having spindles 59 on which spools 60 of welding wire are rotatively supported. The welding wire passes from a spool 60 to one of the welding heads 51–53 on curved path, the wire being protected by a guide tube as is customary and well known in the art.

Figure 3:
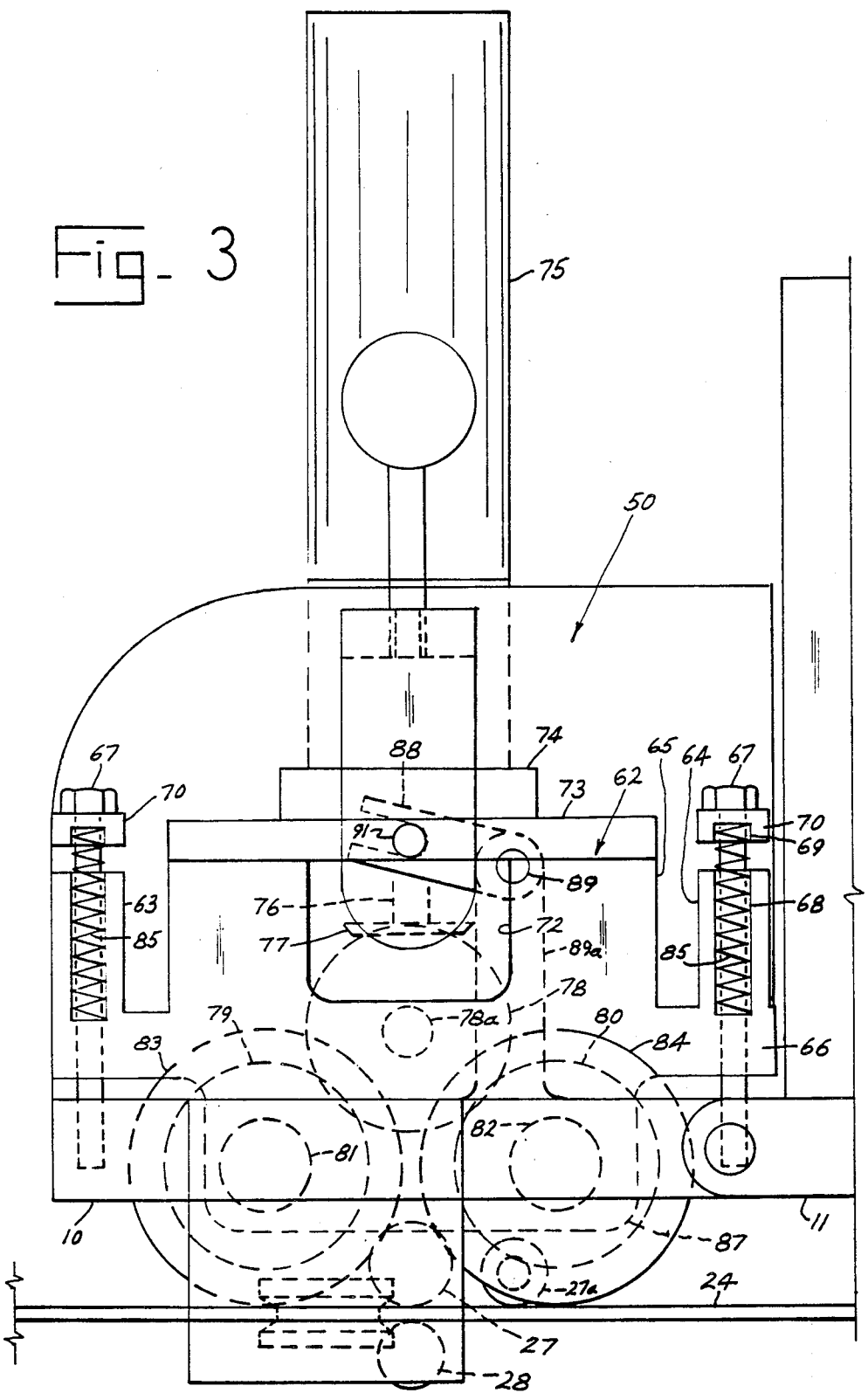
FIG. 3 is an enlarged side elevation of a portion of the apparatus shown in FIGS. 1 and 2.

FIG. 3 shows carriage base plate 10 which supports the drive wheel assembly 50. An irregularly shaped body 62 has upstanding end portions 63, 64, and central upstanding portion 65 all connected to lower cross portion 66. End portions 63, 64 each have at their tranverse center, as shown in FIG. 3, a central hole into which a screw 67 is slidably inserted. The screws 67 are screwed into tapped holes in base plate 10. Equally spaced at opposite sides are cylindrical recesses 68, 69, the latter being at an underside of cross bar 70. A screw 67 passes through the cross bar 70 through an opening through which the screw may slide, so that the bar 70 may move upwardly and downwardly along the screw 67. This construction permits body 62 to move upwardly and downwardly along screws 67, the upward movement being limited by the spacing of the head of screw 67 above the cross bar 70, and the downward movement of body 62 being limited by contact thereof with the upper side of base plate 10. Body 62 has, at its front side, an opening 72 to provide access thereinto, the body 62 being hollowed between its front and back sides. A bar 73 is disposed above body 62. A motor base plate 74 is carried above bar 73, as shown. Plate 74 supports an electric servomotor 75. The shaft 76 of motor 75 has a bevel gear 77 at its lower end. Bevel gear 77 engages a bevel gear 78 which is supported on a shaft 78a. Shaft 78a is supported between the front and back walls of body 62. Gear 78 engages gears 79, 80 carried concentrically on the hubs 81, 82 of wheels 83, 84.

The helical compression springs 85 bias body 62 downwardly. The shafts 81, 82 of wheels 83, 84, respectively, are supported by downwardly extending portion 87 at each of the front and back of body 62. When body 62 is moved downwardly by springs 85, the wheels 83, 84 are also moved downwardly to engage against track 24 on which the carriage is supported. Body 62 and wheels 83, 84 may be moved upwardly, away from track 24, by crank 88.

Figure 4:
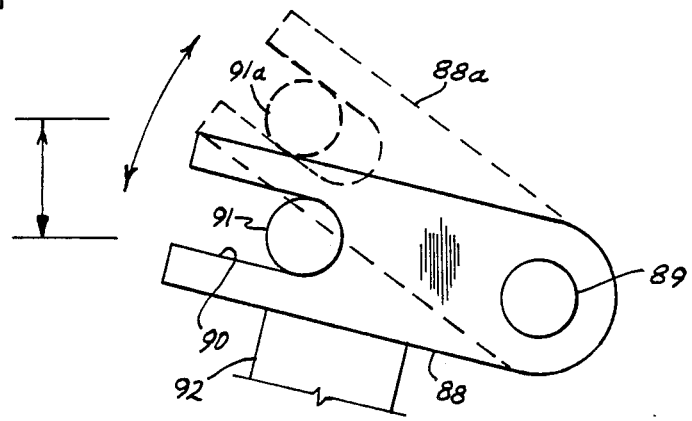
FIG. 4 is an enlarged partial view showing one assembly of the apparatus shown in FIGS. 1–3.

Crank 88 is better shown in FIG. 4 of the drawings. Crank 88 is mounted pivotally on shaft 89 supported by pillars 89a formed on plate 10. Yoke 90 of crank 88 engages around a shaft 91 which depends between the front and back walls of body 62. Crank 88 is rotatable and when urged by movement of handle 92 (FIG. 2) may be moved to the dashed line position 88a. This movement of the crank moves shaft 91 upwardly to a position 91a, lifting body 62 and carrying wheels 83, 84 away from track 24. Crank handle 92 is articulated and when moved past dead center becomes locked in the "up" position, to hold body 62 in its upwardly moved position against the compression of springs 85. As stated before, body 62 slides on screws 67 which are anchored into plate 10. When handle 92 is operated to lower crank 88, body 62 is lowered toward track 24 and wheels 83, 84 engage the track in position for movement of the position of the carriage along the track. Wheels 83, 84 are disengaged from the track when mounting the carriage on the track, and are disengaged from the track when it is desired to push the carriage along the track by hand without motor power.

The unitized structure of the drive wheel assembly makes it easy to remove for repair or replacement, if necessary. The welding head assemblies may be removed easily, by merely unscrewing them from base plate 12. The central base plate 11 is adequately supported by base plates 10, 12, and is used to support control apparatus (not shown). Since the drive wheel motor is reversible, the carriage may be driven in either direction along the track, and because of the improved drive wheel traction afforded by the tandem drive wheels, the carriage may travel vertically up and down the sides of a pipe without difficulty.

It is clear that the apparatus as described will be stable in use and will be useful in forming superior welds at a joint or seam between abutted pipe ends. The apparatus is rigid end to end, and the wheel arrangement is such as will firmly grip the track to prevent unwanted movements of the carriage. The drive wheels serve to clamp the carriage to the track, being spaced to opposite sides of the track face wheels to provide triangulated track engagements longitudinally as well as transversely of the track. The idler wheels make the carriage easy to install on the track, since they support one side of the carriage during installation so that it need not be supported by hand while the pivotal support wheel sets are moved into engagement with the track.

While a preferred embodiment of the invention has been described and shown in the drawings, many modifications thereof may be made by a person skilled in the art without departing from the spirit of the invention, and it is intended to protect by Letters Patent all forms of the invention falling within the scope of the following claims.

I claim:

1. Welding carriage, comprising three base plates hinged together end-to-end to be articulated for bending against a convexly curved object, means for fixing said hinged together base plates against movements from a preselected angularity, each end one of such base plates having a set of support wheels at each of its opposite sides for supporting said carriage on a strip track of uniform width which is fixed in a loop uniformly spaced about an object, said track having an inner side facing said object and an outer side facing away from said object, each said set of support wheels including a wheel engaged with the outer side of said track and a wheel engaged with the inner side of said track and a wheel engaged with an edge of said track, said sets of support wheels at one side of said carriage and track being pivotally movable away from the side of said carriage whereby said carriage may be readily installed on and removed from said track, spring means for moving said pivotally movable sets of wheels inwardly and outwardly and for fixing them in their inward and outward positions, one end one of said base plates supporting drive wheel means which extend through an opening through said base plate to engage said track, spring means biasing said drive wheel means toward said track, and crank means for raising said drive wheel means away from said track against said bias of said spring means, said end base plates having auxiliary wheel means adjacent said sets of support wheels at said one side of said carriage to support said end base plates on said track while said sets of support wheels at said one side of said carriage are pivotally moved outwardly.

2. The combination of claim 1, said auxiliary wheel means being at the same level as said wheels of said set of support wheels which engage the outer side of said track, whereby said end base plates are supported in position for pivotal movements of said sets of support wheels at said one side of said base plates.

3. Welding carriage, comprising three base plates hinged together end-to-end to be articulated for bending against a convexly curved object, means for fixing said hinged together base plates against movements from a preselected angularity, each end one of such base plates having a set of support wheels at each of its opposite sides for supporting said carriage on a strip track of uniform width which is fixed in a loop uniformly spaced about an object, said track having an inner side facing said object and an outer side facing away from said object, each said set of support wheels including a wheel engaged with the outer side of said track and a wheel engaged with the inner side of said track and a wheel engaged with an edge of said track, said sets of support wheels at one side of said carriage and track being pivotally movable away from the side of said carriage whereby said carriage may be readily installed on and removed from said track, spring means for moving said pivotally movable sets of wheels inwardly and outwardly and for fixing them in their inward and outward positions, one end one of said base plates supporting drive wheel means which extend through an opening through said base plate to engage said track, spring means biasing said drive wheel means toward said track, and crank means for raising said drive wheel means away from said track against said bias of said spring means, said drive wheel means comprising tandem drive wheels and a single driven circular gear engaged with gears carried by said tandem drive wheels, said single driven circular gear being driven by a single electric drive motor, including a movable support body disposed for movement through an opening through said base plate, said body having an upstanding portion at its opposite ends having a screw passage therethrough, a screw connected to said base plate extending freely through each said screw passage of a said upstanding portion and through a crossbar disposed thereabove, compression spring means acting between each said upstanding portion and the crossbar thereabove, the head of each said screw limiting movement of said crossbar and said upstanding portion therebeneath away from said track, said support body having said tandem drive wheels and said electric drive motor mounted thereon, crank means for moving said support body away from said track against said bias of said compression spring means, whereby said tandem drive wheels may be lifted away from said track to inoperative positions said tandem drive wheels when released by said crank means being urged against said track by said compression spring means to drive said carriage along said track when said electric drive motor is operated, said end base plates having auxiliary wheel means adjacent said sets of support wheels at said one side of said carriage to support said end base plates on said track while said sets of support wheels at said one side of said carriage are pivotally moved outwardly.

4. The combination of claim 3, said auxiliary wheel means being at the same level as said wheels of said set of support wheels which engage the outer side of said track, whereby said end base plates are supported in position for pivotal movements of said sets of support wheels at said one side of said base plates.

* * * * *